MILHOLLAND & CRANE.
Bee Hive.
No. 2,592. Patented April 29, 1842.
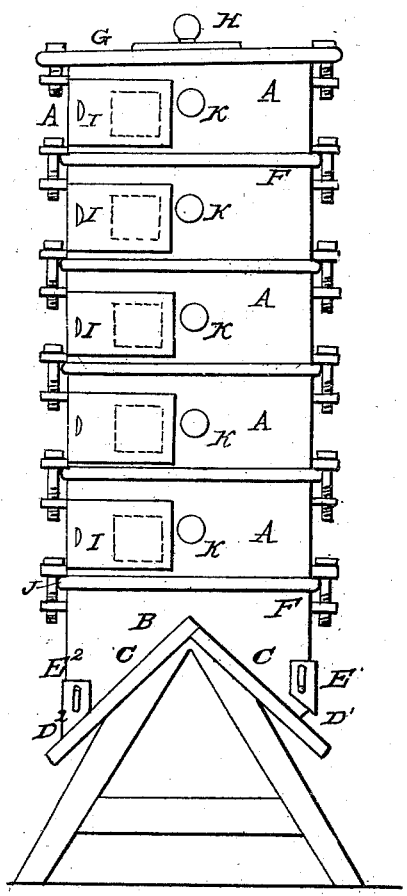
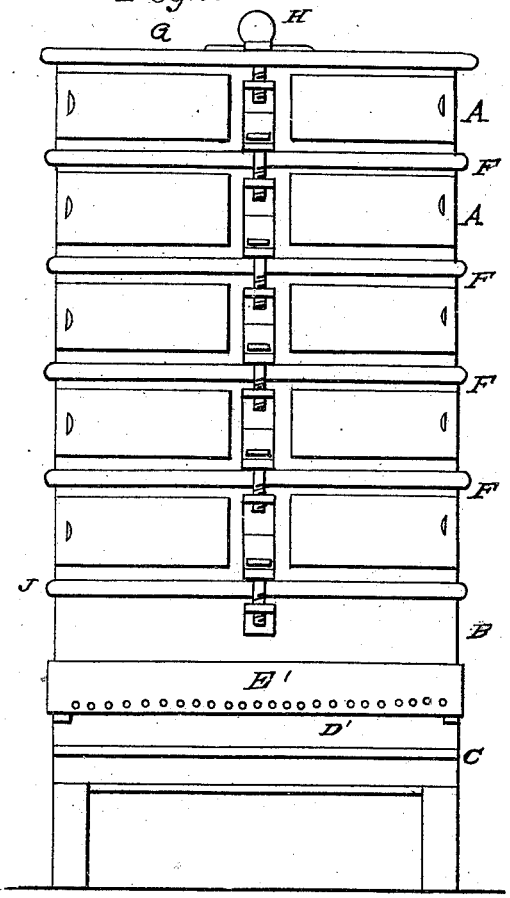
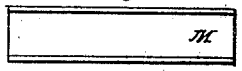
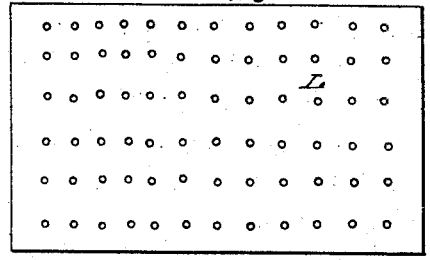

UNITED STATES PATENT OFFICE.

JNO. MILHOLLAND AND BENJN. CRANE, OF CHANDLERSVILLE, OHIO.

BEEHIVE.

Specification of Letters Patent No. 2,592, dated April 29, 1842.

*To all whom it may concern:*

Be it known that we, JOHN MILHOLLAND and BENJAMIN CRANE, of Chandlersville, in the county of Muskingum and State of Ohio, have invented a new and useful Improvement in the Construction and Use of Beehives, which is described as follows, reference being had to the annexed drawings of the same, making part of this specification, of which—

Figure 1 is an end elevation; Fig. 2, front elevation; Fig. 3 the perforated slide; Fig. 4, the tube.

Similar letters refer to corresponding parts.

The nature of this invention is in constructing the bee house in horizontal rectangular sections or boxes without tops or bottoms placed upon a base (supported by four spreading legs) in which base is a double inclined bottom for the discharge of all offensive matter), said sections being piled upon the base and upon one another until the house is raised to a sufficient height when the upper box is covered with a horizontal top, the said boxes being secured to each other and to the base and top by means of ears fastened to the sides of the aforesaid parts having screw bolts passed vertically through them; or the several sections may be secured together in any other convenient way, said boxes or sections being provided with the usual windows through which to see the operation of the bees or to examine the interior of the hive, and shutters to close over them and apertures in the ends for the passage of the bees. To a new hive placed against the old one in colonizing the bees when the return of the bees is cut off by inserting the horizontal plate L and shutting down the vertical slides over the entrances to the hive, the top being also provided with an aperture for introducing a swarm of bees in the usual manner.

The bee house A may be made of any convenient size. We generally make them about two feet ten inches high, two feet long, and one foot three inches broad of inch poplar or pine boards, or of any suitable stuff.

The base B should be about 9 or 10 inches deep, dovetailed at the corners having the ends grooved on the inside or recessed at right angles as represented in the drawings to receive the inclined bottom C, which should be made in two parts, each part inclining upward toward each other at an angle of about 45 degrees with a horizontal plane—their upper edges meeting together at the center of the interior of the base in the manner of a roof of a house, so as to discharge the offensive matter from the hive on either side, where openings D are left for that purpose, and for the entrance of the bees and for a free circulation of air which takes place in hives with two entrances one opposite the other more freely than in hives with only one entrance on one side.

The aforesaid entrances for the bees are marked D′ D². The slides for closing them are marked E′ E² and are perforated. The slide E′ is open—the slide E² is closed. The perforations are to admit air when the ingress and egress is shut off in colonizing the bees.

The superstructure of the bee house, as before stated, consists of a series of horizontal rectangular boxes A, each about 5 inches deep and dovetailed at the corners having moldings F around the lower edges outside to prevent the entrance of air or water; and cross sticks in side near the upper edges running crosswise or lengthwise, so as to cross the comb in the usual manner.

When the sections are put together they should be arranged so that the windows with which they are provided should be in alternate order.

The fastenings may be such as those before described and represented in the drawing or they may be of any suitable kind.

The roof or top G is a plain rectangular board having an opening in the center through which a swarm is introduced in the usual manner. At other times it is closed by a lid H. The roof c, is secured to the top of the upper box by screw-bolts and ears made like those used for fastening the boxes together or in any convenient way. The base or bottom has no cross sticks, as the bees are never suffered to reach it with the comb.

K handles or knobs for the convenience of handling the boxes.

The slide or plate L inserted at the joint J when colonizing the bees is perforated to admit air to the old hive and cause them to work through the new hive or house. These houses are generally commenced with three boxes. The fourth box is slipped under the three between the lower one and the base, then the fifth box between the fourth one and the base. Then all the boxes, base, and roof are secured together in the manner before described.

To remove the honey the following process is pursued: Take out the screw bolts of the top and at the first joint. Raise the first or upper box sufficiently high to admit the then rectangular metallic slide L. Then insert the slide L between the first and second box. Then remove the upper box and take the top G from the same and put it in the place of the slide over the top of the second box, which will now be the upper box. Then empty the box A of its honey and put it between the lower box and the base. In this manner all the boxes are treated and thus a perpetual draft of honey is obtained without destroying the bees or driving them from the hive.

When the bees become too numerous and ready to swarm, which will soon be the case, prepare another bee house in the manner above described. Then provide a tube M about two inches square, three inches long and insert it in the apertures in the ends of the boxes represented by dotted lines and closed by the slides I, said tube being well plastered around the joints with clay or mortar to prevent the entrance of insects. Then insert the then rectangular plate L between the lower box and base at the joint J and shut down the vertical slides E′ E² over the entrances; this arrangement of the slides prevents the egress and ingress of the bees through the entrances of the base and compels them to go into the new house through the tube. The passage for the bees will now be through the new house. When the bees have commenced building in the new house and have a sufficient quantity for a colony remove the tube and insert the end slides and remove the new house. Then remove the horizontal slide and raise the vertical slides of the old house. The bees will then recommence their operations in the old house.

In commencing a bee house with an old hive put it on the top of the house over the aforesaid opening in the top and secure the joints well with mortar. The bees will descend and commence operations in the upper box of the house. Then remove the hive and close the aperture.

Among the advantages possessed by this bee house over others in use are: 1, its susceptibility of being perpetually emptied of its accumulated honey without disturbing or distroying the bees and in larger quantities and of a purer quality; 2, complete ventilation; 3, effectual discharge of all offensive matter; 4, convenience of swarming the bees; 5, causing the bees to thrive better and increase faster; 6, in not disturbing the bee bread.

What we claim as our invention, and which we desire to secure by Letters Patent, is—

The construction and manner of using the boxes composing the bee house as before described.

JOHN MILHOLLAND.
BENJAMIN CRANE.

Witnesses:
 DANIEL C. WASTENLER,
 T. H. BROWN.